United States Patent [19]

Beckerman

[11] Patent Number: 4,890,004

[45] Date of Patent: Dec. 26, 1989

[54] EMERGENCY LIGHT CONTROL AND BATTERY CHARGING SYSTEM

[76] Inventor: Howard L. Beckerman, 151 Ivy Hill Rd., Red Bank, N.J. 07701

[21] Appl. No.: 273,487

[22] Filed: Nov. 21, 1988

[51] Int. Cl.[4] .............................. H02J 7/00; H02J 9/00
[52] U.S. Cl. ........................................ 307/66; 315/86
[58] Field of Search ................... 307/66; 320/DIG. 2; 315/86

[56] References Cited

U.S. PATENT DOCUMENTS

| | | | |
|---|---|---|---|
| 3,341,764 | 9/1967 | Kongable | 320/DIG. 2 |
| 4,150,302 | 4/1979 | Roche | 307/66 |
| 4,223,232 | 9/1980 | Bulat | 307/66 |
| 4,240,022 | 12/1980 | Kilinskis et al. | 320/DIG. 2 X |
| 4,323,820 | 4/1982 | Teich | 307/66 X |
| 4,388,534 | 6/1983 | Love et al. | 307/66 |
| 4,712,055 | 12/1987 | Houser, Jr. | 320/DIG. 2 X |

FOREIGN PATENT DOCUMENTS 46-41987 12/1971 Japan ............................ 320/DIG. 2

*Primary Examiner*—William M. Shoop, Jr.
*Assistant Examiner*—Sharon D. Logan
*Attorney, Agent, or Firm*—David L. Davis

[57] ABSTRACT

An emergency light control and battery charging system utilizes a temperature compensated switched voltage regulator for charging the battery. Energization of the emergency light is effected through a field effect transistor which is turned on through a voltage doubler circuit enabled when there is a failure in the power supply. The system is arranged with a latch that insures that the light is not turned on when the battery is connected until after line power is initially applied. A low battery voltage detector insures that the battery is protected from a deep cycle discharge if line voltage is not restored.

12 Claims, 2 Drawing Sheets

EMERGENCY LIGHT CONTROL AND BATTERY CHARGING SYSTEM

BACKGROUND OF THE INVENTION

This invention relates to emergency light control and battery charging systems and, more particularly, to such a system which provides extended battery life and high efficiency.

In commercial establishments, such as stores and office buildings, emergency lighting systems are often required under municipal building codes and safety ordinances. Such systems typically include a battery which is maintained in its charged state whenever conventional electrical AC power is available. When such power fails, emergency lights are turned on and powered from the battery until the conventional power is restored. When power is restored, the battery is recharged.

While such systems have been in fairly widespread use in the past, such systems suffer from a number of drawbacks. For example, such systems typically utilize a linear type of voltage regulation in the battery charging circuit. This results in a relatively large transformer and the requirement that the voltage regulator must have a heat sink.

Another drawback in such prior systems is due to the fact that the battery needs a slightly higher charging voltage when the ambient temperature is low and a slightly lower charging voltage when the ambient temperature is high. The reason for critical battery voltage control is to extend the life of the battery. In emergency lights, the battery must last from three to five years in the standby mode and constantly trickle charging a battery will cause it to fail in a few months. The energy from the trickle charger, after a battery is fully charged, goes into converting its internal chemicals into unusable compounds or electroplating its terminals into useless stubs. Another problem is that a battery can be discharged and still show full voltage. For example, a 6 volt battery will measure 6 volts even when discharged, so that to charge this battery more than 6 volts must be applied to it for current to flow. At 75° F, the battery can be fully charged at 6.8 volts, whereas the battery will be destroyed at 7 volts.

Accordingly, it is an object of this invention to provide an improved emergency light control and battery charging system.

It is a further object of this invention to provide such a system where the voltage regulator is switched, rather than linear, to allow a lower wattage and smaller transformer to be utilized and to avoid the requirement that the voltage regulator must have a heat sink.

It is another object of this invention to adjust the charging voltage based on ambient temperature in order to achieve longer battery life.

SUMMARY OF THE INVENTION

The foregoing, and additional, objects are attained in accordance with the principles of this invention by providing a system adapted for connection to a source of conventional electrical AC power, a battery, and a light, the system being arranged to keep the battery charged from the power source and in the event of a disruption in the AC power source to energize the light from the battery. The system according to this invention comprises a power supply for converting the conventional electrical AC power to DC power between a supply line and a reference line, charging means including switched voltage regulating means coupled between the power supply and the battery for selectively charging the battery to maintain the battery voltage within a predetermined range, latch means coupled to the power supply for providing a latch signal upon initial connection of the system to the AC power source, and enable means coupled to the power supply and to receive the latch signal for energizing the light when the latch signal is present and the DC power is absent.

In accordance with a feature of this invention, the system further includes a low battery voltage detector coupled to the battery and the latch means for sensing the battery voltage and disabling the latch means to eliminate the latch signal when the batter voltage is below a preset level.

In accordance with another feature of this invention, the charging means is temperature regulated to increase the charging voltage to the battery as the ambient temperature decreases.

BRIEF DESCRIPTION OF THE DRAWING

The foregoing will be more readily apparent upon reading the following description in conjunction with the drawing wherein.

DETAILED DESCRIPTION

Figure 1:
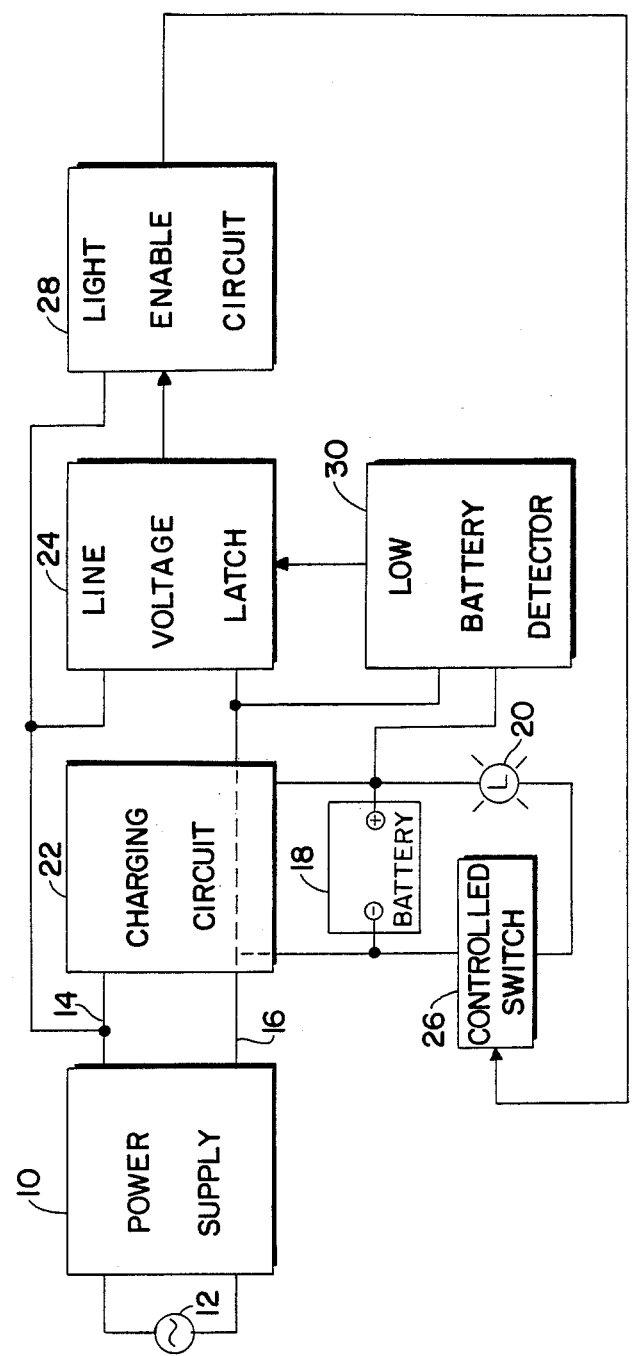
FIG. 1 a block diagram of an emergency light control and battery charging system constructed in accordance with the principles of this invention.

Referring now to the drawing, wherein like elements in different figures thereof have the same reference numeral applied thereto, FIG. 1 shows a block diagram of a system constructed in accordance with the principles of this invention. As shown in FIG. 1, the system includes a power supply 10 hard wired to a conventional AC power source 12. Typically, when such a system is installed, it is connected directly to the power wiring in the building. The power supply 10 functions to convert the AC power from the source 12 to DC power between a supply line 14 and a reference line 16. This DC power is then utilized by the system to maintain the charge on the battery 18 and to control energization of the emergency light 20 upon detection of a failure in the source 12.

Accordingly, the system includes a charging circuit 22 which operates to selectively charge the battery 18 to maintain the battery voltage within a predetermined range. As will be described in full detail hereinafter, the charging circuit 22 includes a switched voltage regulator and also includes a temperature regulator which increases the charging voltage to the battery 18 as the ambient temperature decreases.

The system also includes a line voltage latch 24 which provides a latch signal upon the initial connection of the system to the AC power source 12. This is to insure that if the battery 18 is connected before power from the source 12 is applied, the light 20 will not be energized. Such energization is delayed until after there is an initial connection to the source 12.

Energization of the light 20 is effected through a controlled switch 26 which is controlled by the light enable circuit 28. The light enable circuit 28 is coupled to the power supply 10 and receives the latch signal from the latch circuit 24 to actuate the switch 26 when the latch signal is present and DC power is absent, DC power being absent upon failure of the AC source 12.

The system also includes a low battery voltage detector 30 for protecting the battery 18 from a deep cycle discharge if power is not restored. The detector 30 operates by sensing the battery voltage and disabling the latch circuit 24 to eliminate the latch signal when the battery voltage is below a preset level. The latch circuit 24 will not be re-enabled until power is restored.

Figure 2:
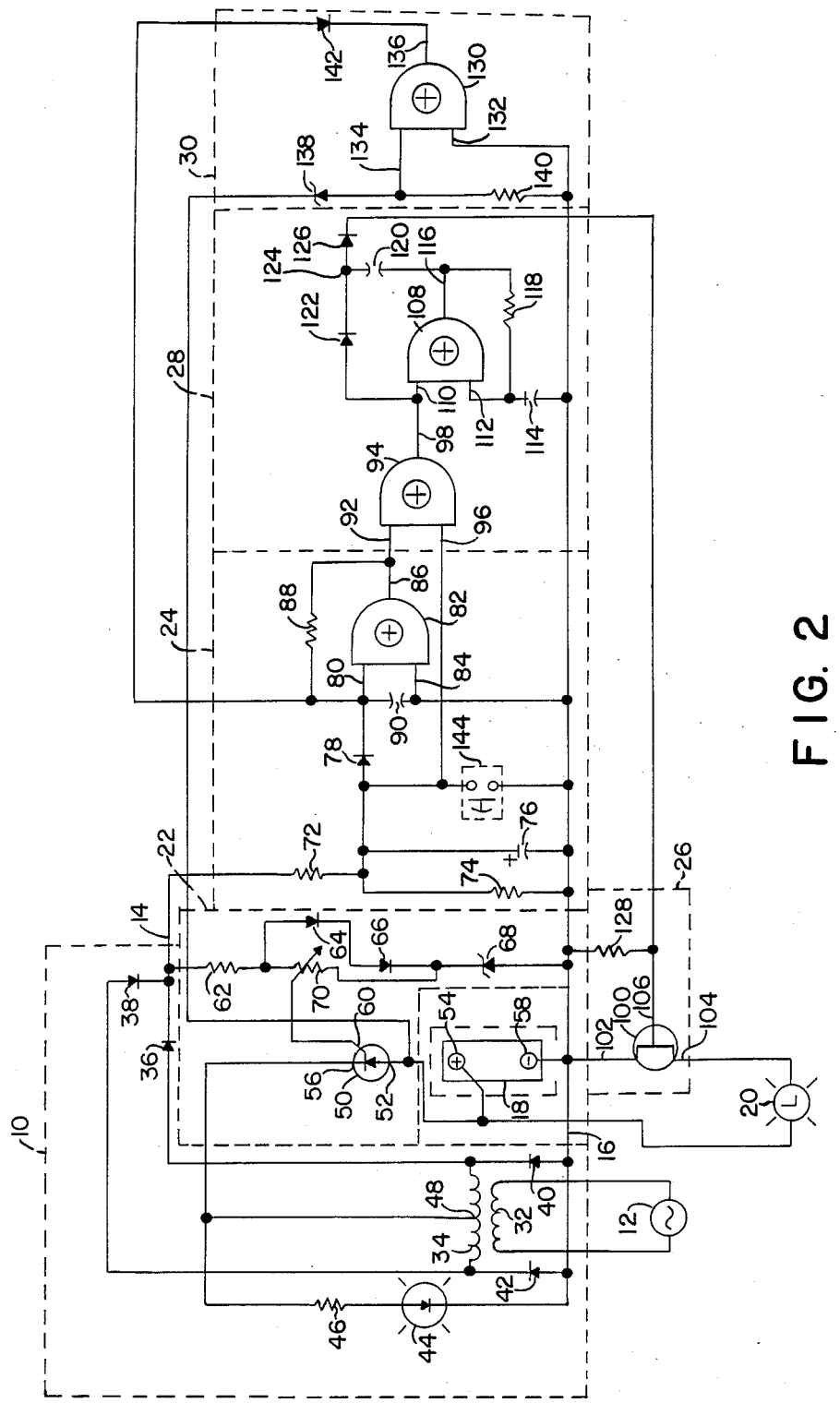
FIG. 2 is a detailed schematic circuit diagram of a preferred embodiment of the system shown in FIG. 1.

Referring to FIG. 2, the power supply 10 comprises a transformer having a primary winding 32 and a center tapped secondary winding 34. The primary winding 32 is directly connected to the AC power source 12. The diodes 36, 38, 40 and 42 are connected as a diode bridge across the secondary winding 34 to convert the step down AC voltage across the secondary winding 34 to a DC voltage between the supply line 14 and the reference line 16. In particular, the diodes 36 and 38 supply the positive potential and the diodes 40 and 42 supply the negative potential. The light emitting diode 44, connected through the dropping resistor 46 between the center tap 48 of the transformer secondary 34 and the reference line 16, lights up whenever power is applied to the power supply 10 from the AC source 12.

The charging circuit 22 includes a silicon controlled rectifier (SCR) 50 having its cathode 52 connected to the positive terminal 54 of the battery 18 and its anode 56 connected to the center tap 48 of the transformer secondary 34. The negative terminal 58 of the battery 18 is connected directly to the reference line 16. Since the cathode 52 of the SCR 50 is connected to the positive terminal 54 of the battery 18, when the gate 60 of the SCR 50 goes 0.6 volts above the cathode 52, the SCR 50 will turn on, conducting current to the battery 18 and thereby charging it. The voltage at the gate 60 is regulated by a series string comprising a resistor 62, diodes 64 and 66, and Zener diode 68. The resistor 62 regulates the current for the diodes 64 and 66, which are connected to have a 1.2 volt drop across them. The potentiometer 70 is connected across the diodes 64 and 66, with its variable tap connected to the gate 60, to allow the gate voltage to be adjusted over this 1.2 volt range. The Zener diode 68 provides regulation at 6.8 volts, which therefore is the minimum of the voltage range at the gate 60. Since the diodes 64 and 66 add 1.2 volts, the maximum of the voltage range at the gate 60 is therefore 8 volts. Because the voltage at the gate 60 is 0.6 volts above the voltage at the cathode 52 and the positive terminal 54 of the battery 18, the adjustment range of the battery voltage is 6.2 volts to 7.4 volts.

In accordance with the principles of this invention, the diodes 64 and 66 have a negative temperature characteristic. This is because when the ambient temperature is cold, the battery 18 needs a slightly higher charging voltage than when the ambient temperature is high. Critical control of the battery voltage helps to extend the life of the battery, as previously described. Illustratively, the diodes 64 and 66 provide $-8$ MV/° C voltage variation with temperature. This offsets the positive temperature coefficients of the other components, such as the Zener diode 68, the gate to cathode voltage of the SCR 50, and the battery 18 itself.

An example is useful for explaining the way the charging circuit 22 operates. Assuming that the potentiometer 70 is set such that the gate 60 of the SCR 50 is at 7.6 volts, the cathode 52 would be at 7 volts. Accordingly, whenever the voltage at the positive terminal 54 of the battery 18 exceeded 7 volts, the SCR 50 is switched off. If the battery voltage drops below 7 volts, the SCR 50 is switched on, and remains on until the battery 18 is fully charged to 7 volts.

The function of the line voltage latch circuit 24 is to prevent the light 20 from being energized when the battery 18 is initially connected before the system is wired to the power source 12. After the line voltage from the source 12 is present, the latch 24 allows normal functioning of the system. This feature is valuable because it prevents the battery from being drained if the lights are installed before line voltage is present. Battery life is severely affected if the battery is left in a discharged state for long periods of time. To provide the described function, the latch circuit 24 includes resistors 72 and 74 connected as a voltage divider to lower the voltage from the supply line 14. This lowered voltage is filtered by the capacitor 76 and is conducted by the diode 78 to terminal 80 of the exclusive OR gate 82. The other input 84 of the gate 82 is connected to the reference line 16. Whenever power is applied to the supply line 14, the input 80 will go high, and since the input 84 is normally low, the output 86 will go high. The resistor 88 connected between the output 86 and the input 80 acts as a positive feedback loop to maintain the output 86 at a high level after it initially goes high, even if the level on the supply line 14 subsequently drops. The capacitor 90 acts as a filter for the terminal 80 so that no noise may enter, and holds it low during connection of the battery 18.

The output 86 of the exclusive OR gate 82 is connected to the input 92 of the exclusive OR gate 94 in the enable circuit 28. The other input 96 of the gate 94 is connected to the power supply 10 through the voltage divider made up of the resistors 72 and 74. Accordingly, under normal operating conditions with full power applied, the inputs 92 and 96 to the gate 94 will both be high and the output 98 will be low. However, if there is a failure in the source 12, the voltage on the line 14 will go low, allowing the input 96 of the gate 94 to go low. Since the input 92 is connected to the latched output 86, it will remain high. Accordingly, failure of the source 12 will result in the output 98 of the gate 94 going high. As will be described, this will cause the light 20 to be energized.

The light 20 is energized when the controlled switch 26 completes a conductive path between the positive terminal 54 of the battery 18, the light 20, and the negative terminal 58 of the battery 18. Preferably, the controlled switch 26 includes a field effect transistor 100 having its source 102 connected to the negative terminal 58 of the battery 18 and its drain 104 connected to the light 20. To turn on the field effect transistor 100 so that it conducts requires a voltage of 10 volts to be applied to the gate 106. This is a greater voltage than that which can be supplied by the battery 18, even if it is fully charged. Accordingly, the enable circuit 28 includes a voltage doubler section to double the battery voltage to provide enough gate drive to turn on the transistor 100.

This voltage doubler section includes the exclusive OR gate 108. When the output 98 of the gate 94 goes high, this causes the input 110 of the gate 108 to go high. The input 112 of the gate 108 is connected to the reference line 16 through the capacitor 114, so it remains low. Accordingly, the output 116 of the gate 108 goes high. This initiates charging of the capacitor 114 through the resistor 118. This continues until the capacitor 114 is charged sufficiently that the voltage at the input 112 is high enough to cause the output 116 of the gate 108 to go low. This causes the capacitor 114 to discharge through the resistor 118. Thus, the circuitry goes into oscillation. The values of the components are illustratively chosen for oscillation to occur at approximately 3 kilohertz. The capacitor 120 and the diode 122 perform the voltage doubling. When the output 116 goes low, the capacitor 120 charges through the diode 122. When the output 116 goes high, the diode 122 is open circuited, and the voltage at the junction 124 rises to twice the power supply voltage. This voltage is supplied through the diode 126 to the gate 106 of the transistor 100. The gate 106 of the transistor 100 has internal capacitance between it and the source 102, and charge transferred into that internal capacitance causes the transistor 100 to turn on. This source-to-gate capacitance filters the oscillation of the voltage doubler. The resistor 128 is a pull down resistor so that when the voltage doubler shuts off, the gate 106 will discharge to zero. However, the discharge through the resistor 128 is slower than the 3 kilohertz oscillation of the voltage doubler, so that once the field effect transistor 100 is turned on by the voltage doubler, it will remain conductive until the voltage doubler is turned off.

The low battery detector circuit 30 includes the exclusive OR gate 130 having its input 132 connected to the reference line 16. This means that when the input 134 is high, the output 136 is high and when the input 134 is low, the output 136 is low. The input 134 is connected to the junction between the Zener diode 138 and the resistor 140. The resistor 140 has its other end connected to the reference line 16 and the Zener diode 138 has its anode connected to the positive terminal 54 of the battery 18. The Zener diode 138 is preferably rated at 2.7 volts, so that when the battery voltage drops below about 4.75 volts, the voltage on the input 134 is low enough to cause the output 136 to go low. When the output 136 goes low, this causes the diode 142 to become conductive and cause the input 80 of the gate 82 to go low. This disables the latch circuit 24 and causes the elimination of the latch signal on the output 86. With the latch signal on the output 86 gone, the enable circuit 28 is turned off, which turns off the voltage doubler section. Once the latch circuit 24 is disabled, it will not become re-enabled until power is reapplied at the source 12. This is an important feature because as soon as the light 20 is turned off, the battery voltage tends to go back to normal even though it is not being charged. For example, a battery discharged to 4.75 volts can rise up again to 6.5 volts as soon as the load is removed, even though no charging has taken place. This could fool the system into thinking that there is enough battery power to run the light 20, and the lights could come back on, resulting in damage to the battery, and a flashing of the lights. Accordingly, with this feature, once the battery 18 is discharged, the light 20 will remain off, until power is reapplied and there is a subsequent power failure.

The disclosed system also includes the provision for testing whether the light 20 will come on upon a power failure. This is accomplished through the push-to-test switch 144. When the actuator of the switch 144 is pressed, this causes the input 96 of the gate 94, to go low, simulating loss of power on the supply line 14. The diode 78 prevents the input 80 of the gate 82 from going low. The previously described action will cause the light 20 to be energized as long as the switch 144 remains closed, the latch circuit 24 remains latched, and the battery voltage is not too low. When the switch 144 is released, the system will go back to its normal standby mode of operation.

In order to appreciate the advantages of the disclosed design, certain features should be highlighted. One feature is the switched nature of the voltage regulation in the charging circuit 22. The silicon controlled rectifier 50 is preferably a type TO-92 device which can supply up to 0.5 amp of charging current to the battery 18. Because of its ON/OFF switching nature, it dissipates very little heat and very little power is lost. Accordingly, a heat sink is not required. Additionally, the transformer in the power supply 10 can be smaller in physical size and of less wattage than would be required with a linear type voltage regulator. A further advantageous feature is the use of the Zener diode 68 in conjunction with the two diodes 64 and 66 for temperature regulation so that ambient temperature variation will cause the charging voltage to vary.

Another advantageous feature is that the logic elements 82, 94, 108 and 130 are all exclusive OR gates. This use of a single type of logic element to perform multiple functions allows the use of a commonly available single integrated circuit having the four gates thereon.

Also, providing a voltage doubler allows the use of a field effect transistor 100. Such a device only has a voltage drop of 0.4 volts at 3 amps of current, while a standard transistor would drop at least 1 volt. When dealing with a 6 volt circuit, this difference in voltage drop is critical. Furthermore, the field effect transistor 100 is of significantly lower cost than a relay and requires no driving current.

Accordingly, there has been disclosed an improved emergency light control and battery charging system. While a preferred embodiment of the present invention has been disclosed herein, it will be apparent to those of ordinary skill in the art that various modifications and adaptations to that embodiment are possible and it is only intended that the present invention be limited by the scope of the appended claims.

I claim:

1. A system adapted for connection to a source of conventional electrical AC power, a battery, and a light, said system being arranged to keep said battery charged from said AC power source and in the event of a disruption in said AC power source to energize said light from said battery, said system comprising:
   power supply means for converting said conventional electrical AC power to DC power between a supply line and a reference line;
   charging means including switched voltage regulating means coupled between said power supply means and said battery for selectively charging said battery to maintain the battery voltage within a predetermined range;
   latch means coupled to said power supply means for providing a latch signal upon the initial connection of said system to said AC power source; and
   enable means coupled to said power supply means and to receive said latch signal for energizing said light from said battery when said latch signal is present and said DC power is absent, said enable means including a field effect transistor in series with said light and voltage doubling means connected to the gate of said field effect transistor.

2. The system according to claim 1 wherein said voltage means comprises:

an exclusive OR gate having two input terminals and an output terminal;

a diode having its anode connected to one of said input terminals;

a first capacitor connected between the cathode of said diode and said output terminal;

a resistor connected between said output terminal and the other of said input terminals;

a second capacitor connected between said other input terminal and a reference line; and means connected to a junction between said cathode of said diode and said first capacitor for connecting said voltage doubling means to said field effect transistor gate.

3. The system according to claim 2 wherein said connecting means includes a diode having its anode connected to said junction and its cathode connected to said field effect transistor gate.

4. The system according to claim 1 further including low battery voltage detector means coupled to said battery and said latch means for sensing the battery voltage and disabling said latch means to eliminate said latch signal when said battery voltage is below a preset level.

5. The system according to claim 1 wherein said charging means includes temperature regulating means for increasing the charging voltage to said battery as the ambient temperature decreases.

6. A system adapted for connection to a source of conventional electrical AC power, a battery, and a light, said system being arranged to keep said battery charged from said AC power source and in the event of a disruption in said AC power source to energize said light from said battery, said system comprising:

power supply means for converting said conventional electrical AC power to DC power between a supply line and a reference line;

charging means including switched voltage regulating means coupled between said power supply means and said battery for selectively charging said battery to maintain the battery voltage within a predetermined range;

latch means coupled to said power supply means for providing a latch signal upon the initial connection of said system to said AC power source; and enable means coupled to said power supply means and to receive said latch signal for energizing said light from said battery when said latch signal is present and said DC power is absent;

said charging means comprising a silicon controlled rectifier with its anode-to-cathode path in series between said power supply means and said battery, and means for controlling the conduction of said silicon controlled rectifier in a switched manner including:

a series string of a resistor, a diode, and a Zener diode connected between said supply line and said reference line;

a potentiometer connected across said diode; and means for connecting the gate of said silicon controlled rectifier to the tap of said potentiometer.

7. The system according to claim 6 wherein said diode has a negative temperature characteristic so that as the ambient temperature decreases the voltage drop across said diode increases.

8. A system adapted for connection to a source of conventional electrical AC power, a battery, and a light, said system being arranged to keep said battery charged from said AC power source and in the event of a disruption in said AC power source to energize said light from said battery, said system comprising:

power supply means for converting said conventional electrical AC power to DC power between a supply line and a reference line including:

a transformer having a primary winding and a center tapped secondary winding;

means for connecting said primary winding to said AC power source; and diode bridge means connected across said secondary winding to provide said DC power between said reference line and said supply line; charging means coupled between said power supply means and said battery for selectively charging said battery to maintain the battery voltage within a predetermined range, including:

a silicon controlled rectifier having its cathode connected to the center tap of said secondary winding and its anode connected to the positive terminal of said battery;

means for connecting the negative terminal of said battery to said reference line;

a resistor having a first end connected to said supply line;

a potentiometer having a first end connected to the second end of said resistor and its variable tap connected to the gate of said silicon controlled rectifier;

a Zener diode having its anode connected to the second end of said potentiometer and its cathode connected to said reference line; and a diode having its cathode connected to the first end of said potentiometer and its anode connected to the second end of said potentiometer, said diode having a negative temperature characteristic so that as the ambient temperature decreases the voltage drop across said diode increases;

latch means coupled to said power supply means for providing a latch signal upon the initial connection of said system to said AC power source; and enable means coupled to said power supply means and to receive said latch signal for energizing said light from said battery when said latch signal is present and said DC power is absent.

9. The system according to claim 8 wherein said latch means includes:

an exclusive OR gate having two input terminals and an output terminal;

means for coupling a first of said input terminals to said supply line;

means for coupling the other of said input terminals to said reference line; and means for providing a positive feedback path from said output terminal to said first input terminal.

10. The system according to claim 9 wherein said enable means includes:

a second exclusive OR circuit having two input terminals and an output terminal;

means for connecting a first of said second exclusive OR gate input terminals to the output terminal of said latch means exclusive OR gate;

means for coupling the other of said second exclusive OR gate input terminals to said supply line; and means for providing a connection to said second exclusive OR gate output terminal.

11. The system according to claim 10 wherein said enable means further includes:

a field effect transistor in series with said light;

a third exclusive OR gate having two input terminals and an output terminal;

a diode having its anode connected to one of said third exclusive OR gate input terminals;

a first capacitor connected between the cathode of said diode and said third exclusive OR gate output terminal;

a resistor connected between said third exclusive OR gate output terminal and the other of said third exclusive OR gate input terminals;

a second capacitor connected between said other third exclusive OR gate input terminal and said reference line; and gate enable means for connecting a junction between said diode and said first capacitor to said field effect transistor gate.

12. The system according to claim 11 wherein said gate enable means includes a diode having its anode connected to said junction and its cathode connected to said field effect transistor gate.

* * * * *